United States Patent
Fu et al.

(10) Patent No.: US 8,666,006 B1
(45) Date of Patent: Mar. 4, 2014

(54) SYSTEMS AND METHODS FOR HIGH SPEED DATA RECOVERY WITH FREE RUNNING SAMPLING CLOCK

(75) Inventors: Wei Fu, San Diego, CA (US); Yuping Luo, Shenzhen (CN); Yanggao Qiu, Shenzhen (CN); Christopher Thomas, San Diego, CA (US)

(73) Assignee: SMSC Holdings. S.a.r.l., Luxembourg (LU)

( * ) Notice: Subject to any disclaimer, the term of this patent is extended or adjusted under 35 U.S.C. 154(b) by 242 days.

(21) Appl. No.: 13/035,213

(22) Filed: Feb. 25, 2011

(51) Int. Cl.
*H04L 7/00* (2006.01)

(52) U.S. Cl.
USPC ......... 375/355; 235/462.28; 700/73; 713/400

(58) Field of Classification Search
None
See application file for complete search history.

(56) References Cited

U.S. PATENT DOCUMENTS

| | | | |
|---|---|---|---|
| 7,567,629 B2 * | 7/2009 | Fredriksson | 375/326 |
| 2002/0031198 A1 * | 3/2002 | Eglit | 375/355 |
| 2004/0084537 A1 * | 5/2004 | Best | 235/492 |

* cited by examiner

*Primary Examiner* — Adolf Dsouza
(74) *Attorney, Agent, or Firm* — King & Spalding L.L.P.

(57) ABSTRACT

Systems and methods are disclosed for improving digital feed-forward data recovery of high speed data from a received data stream in a data transceiver or receiver where the receiver clock is asynchronous to the transmitter clock used to transmit the received data stream. In one example, the received data stream is oversampled using N evenly-spaced multi-phase clocks. The oversampled data are packed into a data block. Data transition edges of the oversampled data in the data blocks with respect to multi-phase clocks are tracked. The tracked data transition edges are used to determine the length of a decision window and to further divide the oversampled data into groups of bits that are hypothesized to be samples of the same received data symbol. Bit mapping is performed on the decision window to recover the received data symbol. By tracking the movement of data transition edges, the technique enhances data recovery capability.

19 Claims, 6 Drawing Sheets

SYSTEMS AND METHODS FOR HIGH SPEED DATA RECOVERY WITH FREE RUNNING SAMPLING CLOCK

BACKGROUND

1. Field of the Invention

The present invention generally relates to data communication and, more particularly, to sampling data in communication receivers.

2. Related Art

In many high speed communication systems using serial non-return-to-zero (NRZ) modulated waveforms (e.g., USB 3.0, PCI Express, SATA/SAS, and optical transmission), information on the transmitting clock used to transmit data is embedded in the transmitted data itself. Transceivers receiving such waveforms use local clocks that are asynchronous to the transmitting clock. Because the transmitting and receiving clocks are asynchronous, clock and data recovery circuitry are often used in the transceiver to extract information on the transmitting clock from the received data. Subsequently, the extracted transmitted clock is used to recover the data from the received data.

Conventionally, clock and data recovery circuitry are implemented in the analog domain using analog PLLs that may include a phase detector, a loop filter, and a VCO (voltage controlled oscillator). However, analog PLLs suffer from large die size, high power consumption, and limitations such as injection locking when there are multiple VCOs. Furthermore, because areas of loop filters are inversely proportional to the loop bandwidth, PLL die areas will grow as increasingly smaller loop bandwidth is required to track higher speed clock embedded in the received data.

Alternatively, clock and data recovery circuitry may be implemented in digital PLLs. A digital PLL may include a digital phase detector, a digital loop filter, and an analog interpolator to replace the phase detector, the loop filter, and the VCO, respectively, of an analog PLL. Digital PLLs using digital loop filters have die areas that are significantly smaller than analog PLLs. Digital PLLs also have die areas that are substantially independent of loop bandwidth. However, like all feedback loops, digital PLLs suffer from limitations in tracking speed. They also incur delays in achieving timing lock that is inversely proportional to the loop bandwidth. In addition, digital PLLs are susceptible to ISI (inter-symbol interference). Accordingly, there is a need for an improved clock and data recovery implementation that achieves fast tracking, has a small footprint, is immune to ISI, and consumes low power.

SUMMARY

Systems and methods are provided to recover data in high speed data transceivers using a free running sampling clock with digital feed-forward data recovery.

In accordance with one or more embodiments of the present disclosure, a method for data recovery includes receiving a stream of data symbols, where the data symbols change at a symbol frequency. The method also includes oversampling the received data symbols with N substantially evenly-spaced multi-phase clocks of substantially identical frequency to generate oversample data. Each of the data symbols is oversampled approximately N times. The method further includes packing the oversampled data into a data block of M samples, where M is an integer multiple of N. The method further includes tracking locations of data transitions of the samples within the data block. The method further includes using the tracked locations to determine a decision window of the data block. The method further includes grouping the samples residing in the decision window into symbol groups. The method further includes making a symbol bit decision for each of the symbol groups.

In accordance with one or more embodiments of the present disclosure, an apparatus for data recovery includes a sampler used to oversample a received stream of data symbols with N substantially evenly-spaced multi-phase clocks of substantially identical frequency to generate oversample data. The data symbols change at a symbol frequency and each of the data symbols is oversampled approximately N times. The apparatus also includes a block packing module used to pack the oversampled data into a data block of M samples, where M is an integer multiple of N. The block packing module also tracks locations of data transitions of the samples within the data block. The block packing module further uses the tracked locations to determine a decision window of the data block. The apparatus further includes a symbol packing module used to group the samples residing in the decision window into a plurality of symbol groups. The apparatus further includes a data symbol decision module used to make a symbol bit decision for each of the symbol groups.

In accordance with one or more embodiments of the present disclosure, a machine readable medium of non-transitory instructions is provided. When executed by one or more processors of a device, the instructions cause the device to receive a stream of data symbols where the data symbols change at a symbol frequency. The device also oversamples the received data stream with N substantially evenly-spaced multi-phase clocks of substantially identical frequency to generate oversample data. Each of the data symbols is oversampled approximately N times. The device further packs the oversampled data into a data block of M samples, where M is an integer multiple of N. The device further tracks locations of data transitions of the samples within the data block. The device further uses the tracked locations to generate a decision window of the data block. The device further groups the samples residing in the decision window into a plurality of symbol groups. The device further makes a symbol bit decision for each of the symbol groups.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Techniques are provided for digital feed-forward data recovery of high speed data from a received data stream in a data transceiver or receiver where the receiver clock is asynchronous to the transmitter clock used to transmit the received data stream. The received data stream is oversampled using evenly-spaced multi-phase clocks. The oversampled data are packed into a decision window of variable length as a function of the locations of the data edge transitions within the multi-phase clocks. Bit mapping is performed on the decision window to recover the received data. An initial length of the decision window is determined based on the maximum frequency offset of the receiver clock relative to the expected data rate.

The digital feed-forward data recovery technique achieves faster locking and tracking of received data compared to feed-back PLLs. In addition, it can tolerate much wider frequency offset and jitter of the local receiver clock, and can also achieve better ISI immunity compared to feed-back data recovery techniques.

Hereinafter, various embodiments of the present disclosure will be explained in further detail with reference to the accompanying figures.

Figure 1:
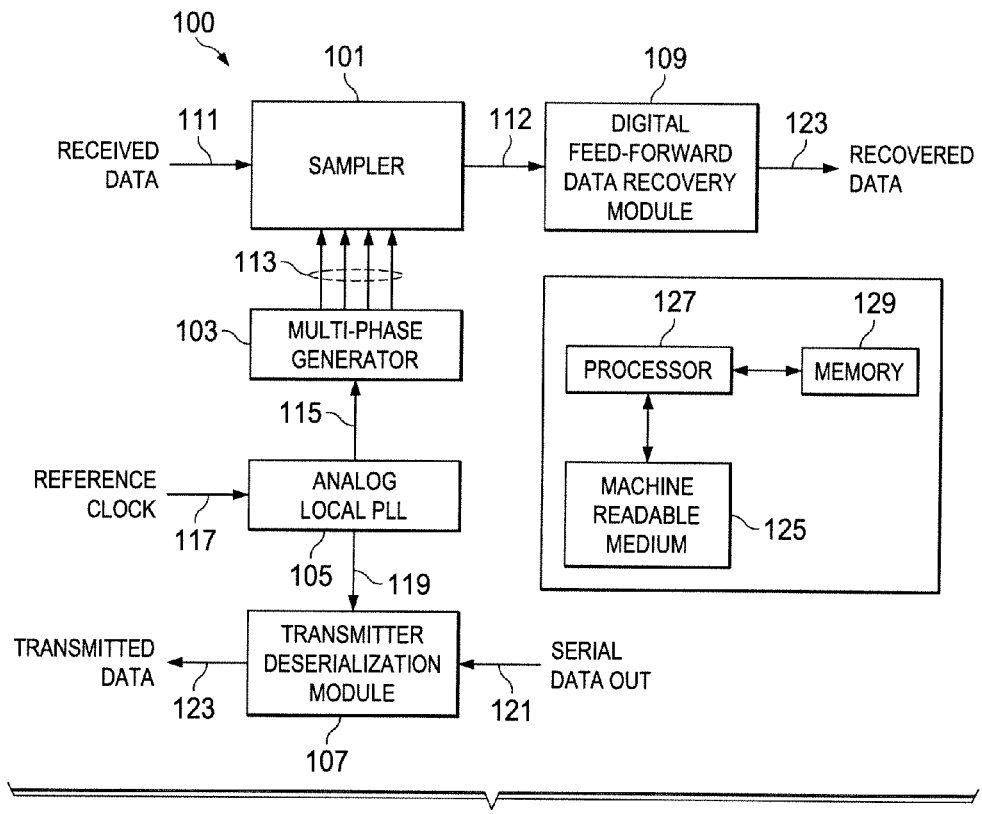
FIG. 1 shows a block diagram of a digital feed-forward data recovery based serial link transceiver for recovering high speed data from a received data stream according to one or more embodiments of the present disclosure.

FIG. 1 shows a block diagram of a digital feed-forward data recovery based serial link transceiver 100 for recovering high speed data from a received data stream according to one or more embodiments of the present disclosure. Serial link transceiver 100 has a sampler 101, a multi-phase generator 103, an analog local PLL 105, a transmitter de-serialization module 107, and a digital feed-forward data recovery module 109. Components of FIG. 1 excluding transmitter de-serialization module 107 may also be provided as part of a data receiver.

Sampler 101 samples received data 111 using a technique called oversampling. In oversampling receivers, received data 111 is sampled using multi-phase clocks 113 at a rate that is faster than the data rate of received data 111. Multi-phase clocks 113 are clocks that have the same frequency but are evenly-spaced in phase. Multi-phase clocks 113 are generated by multi-phase generator 103 from a receiver clock 115. The number of multi-phase clocks 113 is N, where N is at least 3. Thus, multi-phase clocks 113 are separated in phase by 1/N of a clock period of receiver clock 115. Sampler 101 generates oversampled data [N−1:0] 112 that correspond to the received data 111 sampled by the N multi-phase clocks 113. Thus, N oversampled data are generated for every clock period of receiver clock 115. N may also be referred to as the oversampling ratio because the clock period of receiver clock 115 is chosen to approximately equal a period of the received data. Accordingly, each period of the received data is approximately oversampled N times by the N clocks of multi-phase clocks 113.

Receiver clock 115 of serial link transceiver 100 is generated by analog local PLL 105 from a local reference clock 117. Analog local PLL 105 also generates a transmitter clock 119 for use by transmitter de-serialization module 107 to generate transmitted data 123 from serial data out 121. Because reference clock 117 is asynchronous to received data 111, receiver clock 115 and multi-phase clocks 113 are also asynchronous to received data 111. Consequently, data transitions of received data 111 move with respect to the sampling edges of multi-phase clocks 113.

Digital feed-forward data recovery module 109 receives oversampled data [N−1:0] 112 and recovers data bits from oversampled data [N−1:0] 112 to produce recovered data 123. For data bit recovery, oversampled data [N−1:0] 112 are packed into blocks made up of multiple data bits for processing. Within each block is a decision window used for making decisions on the data bits contained within the block. Data transition edges of oversampled data in the blocks with respect to multi-phase clocks 113 are tracked near the beginning and near the end of the decision window. The tracked data transition edges are used to determine the length of the decision window and to further divide the oversampled data into groups of bits that are hypothesized (e.g., estimated) to be samples of the same received data bit. Bit mapping is performed using these groups of oversampled data bits to recover the received data bits. By tracking the movement of data transition edges across sampling edges of multi-phase clocks 113, digital feed-forward data recovery module 109 is able to track frequency offset between transmitter clock information embedded within received data 111 and reference clock 117. Clock jitter of reference clock 117 and input data modulated by spread spectrum clock may also be tracked to enhance data recovery capability. Alternatively, serial link transceiver 100 may be implemented as software (e.g., non-transitory instructions) stored on a non-transitory machine readable medium 125 and executed by a system or device including one or more processors 127 and one or more memories 129.

Figure 2:
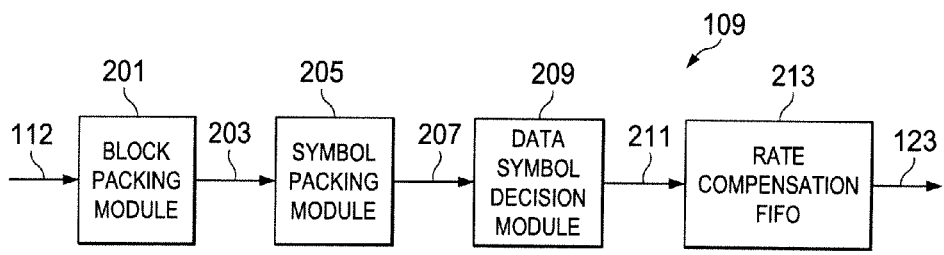
FIG. 2 shows a block diagram of the digital feed-forward data recovery module of FIG. 1 according to one or more embodiments of the present disclosure.

FIG. 2 shows a block diagram of the digital feed-forward data recovery module 109 of FIG. 1 according to one or more embodiments of the present disclosure. Block packing module 201 packs oversampled data [N−1:0] 112 into blocks to facilitate processing. In one embodiment, a block encompasses a number of the oversampled data that is equal to an integer multiple of the oversampling ratio N. Because each period of the received data is oversampled approximately N times, each block encompasses a number of bits of received data 111 that is approximately equal to the integer multiple number. For example, if there are 4 multi-phase clocks (N=4), the integer multiple may be set to 32 such that 128 samples of oversampled data [N−1:0] are packed into each block. Each 128-sample block thus encompasses approximately 32 bits of received data 111. The block may be further divided into a concatenation of two equally sized data packets, also known as a current data packet and a previous data packet. For example, the 128-sample block may be a concatenation of a 64-sample current data packet and a 64-sample previous data packet. The decision window used for making bit decisions is constructed from most of the samples of the current data packet and a few of the samples of the previous data packet, as will be explained herein. The decision window is output from block packing module 201 as decision window samples 203.

To be able to make bit decisions reliably, the decision window may be chosen such that the movement of data transition edges within the decision window can not exceed half of a period of receiver clock 115 in either direction. For example, for N=4, the data transition edge may occur between one of four pairs of multi-phase clocks 113. If each pair of multi-phase clocks 113 is separated by ¼ of the period of receiver clock 115, the movement of the data transition edge across the decision window is constrained to ±½ of the period of receiver clock 115 so that the data transition edges can be tracked and resolved unambiguously. The data transition edges may move due to a frequency offset between received data 111 and receiver clock 115, and also due to clock jitter on receiver clock 115. Therefore, the size of the decision window is a function of the expected maximum frequency offset between received data rate and receiver clock 115. The smaller the frequency offset, the bigger may the decision window be chosen such that movement of data transition edges caused by the frequency offset and the clock jitter across the decision window remains within ±½ of the period of receiver clock 115.

Figure 3:
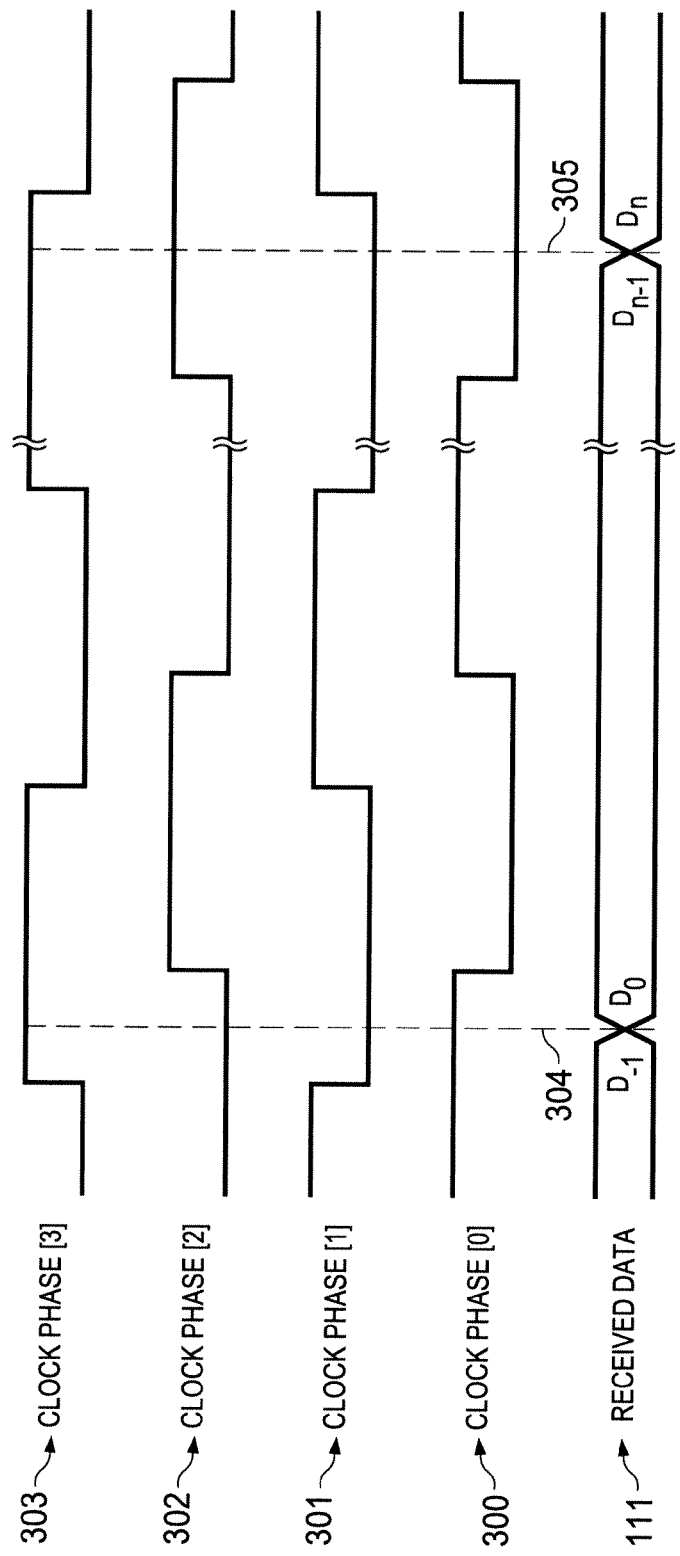
FIG. 3 shows phase relationships between four multiphase clocks used to 4× oversample the received data stream according to one or more embodiments of the present disclosure.

FIG. 3 shows phase relationships between four multiphase clocks used to 4× oversample the received data according to one or more embodiments of the present disclosure. Clock phase [3:0] 300-303 are the four phases of multi-phase clocks 113 evenly-offset in phase by ¼ of a clock period of receiver clock 115. Received data 111 is sampled on the rising edges of clock phase [3:0] 300-303. Data transition edges fall into one of four possible phase offset intervals between clock phase [3:0] 300-303 and may move over time due to the asynchronous timing of the received data 111 with respect to receiver clock 115. For example, data transition edge 304 between data $D_{-1}$ and $D_0$ falls between clock phase [3] 303 and clock phase [2] 302. If the frequency of clock phase [3:0] 300-303 is higher than the frequency of received data 111, or equivalently if the period of clock phase [3:0] 300-303 is shorter than the period of received data 111, then at some later time data transition edge 305 between data $D_{n-1}$ and $D_n$, moves to the interval between clock phase [2] 302 and clock phase [1] 301.

Figure 4:
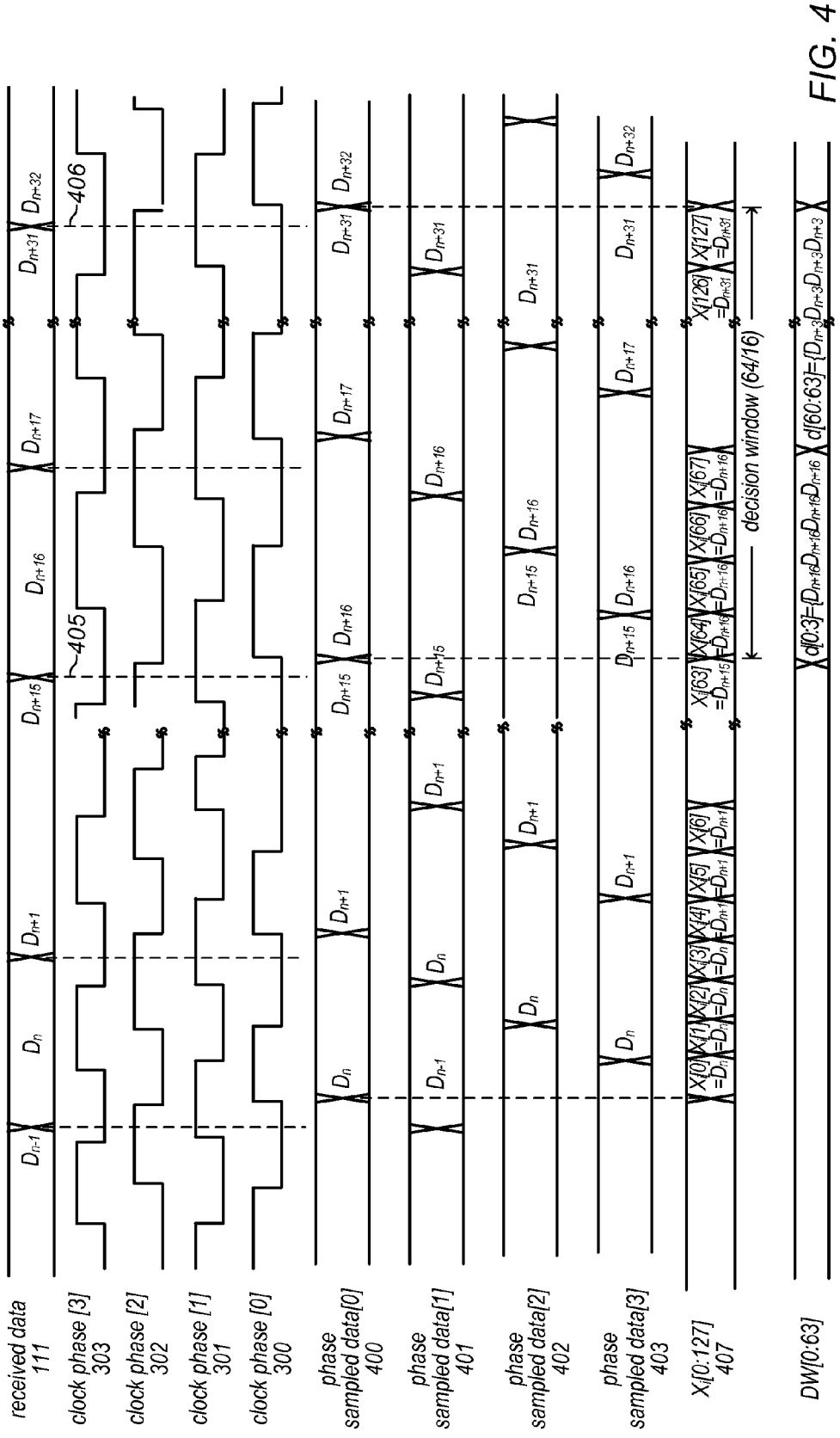
FIG. 4 illustrates packing of oversampled data into a 64-bit decision window used to recover 16 bits of received data according to one or more embodiments of the present disclosure.

FIG. 4 illustrates packing of oversampled data into a 64-bit decision window by the block packing module of FIG. 2 to recover 16 bits of received data according to one or more embodiments of the present disclosure. Received data 111 are over sampled by clock phase [3:0] 303-300 to generate oversampled data [N−1:0] 112, which are represented by phase sampled data [3:0] 403-400. Block packing module 201 packs phase sampled data [3:0] 403-400 into a 128-sample block, selected to equal 32 times the oversampling ratio of 4. Other integer multiples of the oversampling ratio N may also be used to construct blocks of other sizes.

In FIG. 4, 32 symbols of received data 111 from $D_n$ to $D_{n+31}$ are sampled and packed into the 128 samples of block $X_i$ [0:127] 407. $X_i$ [0:63] is called the previous data packet and $X_i$ [64:127] the current data packet. For example, previous data packet $X_i$ [0:63] in FIG. 4 may be [$D_n$, $D_n$, $D_n$, $D_n$, $D_{n+1}$, $D_{n+1}$, ... $D_{n+15}$, $D_{n+15}$, $D_{n+15}$, $D_{n+15}$] and current data packet $X_i$ [64:127] may be [$D_{n+16}$, $D_{n+16}$, $D_{n+16}$, $D_{n+16}$, $D_{n+17}$, ... $D_{n+31}$, $D_{n+31}$, $D_{n+31}$, $D_{n+31}$]. A decision window for making bit decisions for a current group of symbols is primarily taken from the current data packet. For example, in FIG. 4, a decision window DW [0:63] is shown. After the bit decisions are made, data in current data packet $X_i$ [64:127] replaces data in $X_i$ [0:63] to become the previous packet for the next block. In addition, the next 64 phase sampled data [3:0] 403-400 are packed into $X_i$ [64:127] to become the current packet for the next block. A decision window for making bit decisions for the next group of symbols is then made based on the new block $X_i$ [0:127] 407. Thus, block $X_i$ [0:127] 407 successively steps through packets of 64 phase sampled data [3:0] 403-400 to generate decision windows for successive groups of symbols.

To generate the decision window, the location of the last data transition edge within previous data packet $X_i$ [0:63] is tracked. This previous packet data transition edge may fall within one of four possible phase offset intervals between clock phase [3:0] 300-303. This previous data transition edge location is denoted by tp_edge[1:0], defined as 0 if the transition is between sampling edges of clock phase [0] 300 and clock phase [1] 301; 1 if the transition is between sampling edges of clock phase [1] 301 and clock phase [2] 302; 2 if the transition is between sampling edges of clock phase [2] 302 and clock phase [3] 303; and 3 if the transition is between sampling edges of clock phase [3] 303 and clock phase [0] 300. In FIG. 4, for example, the last data transition edge within previous data packet $X_i$ [0:63] occurs at transition edge 405 between data $D_{n+15}$/$D_{n+16}$. This data transition edge falls between rising edges of clock phase [1] 301 and clock phase [0] 300. Therefore, tp_edge[1:0] is 0. Note that previous data packet $X_i$ [0:63] fully captures $D_{n+15}$ as the last four samples of $X_i$ [0:63] in $X_i$ [60:63]. $D_{n+16}$ is then captured as the first four samples of current data packet $X_i$ [64:127]. For an oversample ratio other than 4, tp_edge may have a bit width other than 2 to represent all the possible phase offset intervals between pairs of multi-phase clocks 113.

Similarly, the location of the last data transition edge within current data packet $X_i$ [64:127] is tracked. This current packet data transition location is denoted by tc_edge[1:0], which is similarly defined as that for tp_edge[1:0]. In FIG. 4, the last data transition edge within current data packet $X_i$ [64:127] occurs at transition edge 406 between data $D_{n+31}$/$D_{n+32}$. Because in the embodiment of FIG. 4, data transition edges do not move relative to the multi-phase clocks, data transition edge 406 remains between rising edges of clock phase [1] 301 and clock phase [0] 300. Therefore, tc_edge[1:0] is also 0. The result is that current data packet $X_i$ [64:127] fully captures $D_{n+31}$ as the last four samples of $X_i$ [64:127] in $X_i$ [124:127]. As mentioned earlier, block $X_i$ [0:127] 407 is successively generated by stepping through packets of 64 phase sampled data [3:0] 403-400. Accordingly, data in current data packet $X_i$ [64:127] for the current block becomes previous data packet $X_i$ [0:63] for the next block. Therefore, tc_edge[1:0] for the current block also becomes tp_edge[1:0] for the next block.

The decision window for block $X_i$ [0:127] 407 represents the samples that will be used for making bit decisions for the current block. To enhance data recovery capability, it is desirable to select the decision window such that it captures a full complement of oversampled data [N−1:0] 112 of received symbols. Accordingly, decision windows may be defined based on tp_edge and tc_edge to encompass the maximum number of fully captured samples of received symbols. In one or more embodiments, the decision window encompasses the full complement of oversampled data of any symbol that overlaps into current data packet $X_i$ [64:127] from previous data packet $X_i$ [0:63], in addition to including the oversampled data of all symbols that are fully contained within current data packet $X_i$ [64:127]. In the embodiment of FIG. 4, $X_i$ [0, 4, 8, ..., 4n ...] captures the first sample of received data 111 as sampled by clock phase [0] 300. The decision window may then be defined as $X_i$ [(64−tp_edge:127−tc_edge] where tp_edge and tc_edge are as previously discussed. The length of the decision window is then 64+tp_edge−tc_edge.

Accordingly, the decision window in FIG. 4 is $X_i$ [64:127], the same as current data packet $X_i$ [64:127]. $X_i$ [64:127] fully captures samples of the 16 symbols of received data [$D_{n+16}$, $D_{n+31}$]. As mentioned earlier, movement of data transition edges caused by the frequency offset and the clock jitter of receiver clock 115 across a decision window is constrained to remain within ±½ of the period of receiver clock 115. Applying this constraint to an over-sampling ratio of 4, if (tc_edge [1:0]−tp_edge [1:0]) modulo 4 is 1, it is hypothesized that receiver clock 115 is slightly slower than the symbol frequency of received data 111. As a consequence, the decision window contains one less sample than would be expected for the number of symbols captured. Conversely, if (tc_edge [1:0]−tp_edge [1:0]) modulo 4 is −1 or +3, it is hypothesized that receiver clock 115 is slightly faster than the symbol frequency of received data 111. As a consequence, the decision window contains one more sample than would be expected for the number of symbols captured. To track the relative clock speed between receiver clock 115 and the symbol frequency of received data 111, a value (e.g., a fractional value) is calculated as the number of samples in the decision window modulo divided by the over-sampling ratio. A positive fractional value indicates that receiver clock 115 is hypothesized to be faster than the symbol frequency of received data 111; a negative fractional value indicates that receiver clock 115 is hypothesized to be slower than the symbol frequency of received data 111.

For the boundary condition where (tc_edge [1:0]−tp_edge [1:0]) modulo 4 is ±2, equivalent to data transition edges moving by ±½ of the period of receiver clock 115, there is an ambiguity as to whether receiver clock 115 is faster or slower than the symbol frequency of received data 111. If receiver clock 115 is faster, the decision window would be expected to capture a lower number of symbols of received data 111 than expected. On the other hand, if receiver clock 115 is slower, the decision window would be expected to capture a higher number of symbols of received data 111 than expected. To resolve this ambiguity, it is desirable to track the movement of the hypothesized frequency of receiver clock 115 relative to the symbol frequency of received data 111 across multiple decision windows prior to the current block.

Accordingly, the fractional value may be accumulated across decision windows to generate an accumulated fractional value (e.g., acc_fractional). The accumulated fractional value is used to track the movement of receiver clock 115 across multiple decision windows. To resolve the frequency ambiguity at the boundary condition, the value of the accumulated fractional value is examined and the decision window is selected so as to drive the value toward zero. The underlying assumption here is that if there is a momentary jitter of receiver clock 115 that drives the frequency of receiver clock 115 in one direction for a decision window, it is likely that the next decision window will observe the receiver clock 115 reverting back to normal. Therefore, frequency ambiguity at the boundary condition may be resolved by hypothesizing receiver clock 115 to be slower if the accumulated fractional value is zero or positive. The decision window would then be hypothesized to capture a higher number of symbols of received data 111 than otherwise. Conversely, receiver clock 115 may be hypothesized to be faster if the accumulated fractional value is negative. The decision window would then be hypothesized to capture a lower number of symbols of received data 111 than otherwise.

In addition to tracking momentary jitters of receiver clock 115, acc_freq also tracks the frequency offset between receiver clock 115 and the symbol frequency of received data 111. For example, if the symbol frequency of received data 111 is denote as 'f' and the frequency offset between receiver clock 115 and the symbol frequency of received data 111 is denoted as 'Δf', then in every f/Δf symbols of received data 111, there will be one more or one less symbol, known as a cycle slip. For an over-sampling ratio of 4, in every f/(4*Δf) symbols of received data 111, there will be an edge slip when the data transition edge moves to the next phase offset intervals between clock phase [3:0] 300-303. Therefore, the accumulated fractional value is reset for every f/(4*Δf) symbols of received data 111.

Generation of the decision window for one or more embodiments of block packing module 201 with an over-sampling ratio of 4 are summarized in Table 1 below for different combinations of tc_edge [1:0] and tp_edge [1:0] of block X, [0:127]. The result shows the samples of X, [0:127] used to generate the decision window, the sample size of the decision window, the number of symbols of received data 112 captured by the decision window, the resulting fractional value, the rules for resolving frequency ambiguities of receiver clock 115 and the resulting number of symbols of received data 112 at the boundary condition when (tc_edge [1:0]−tp_edge [1:0]) modulo 4 is ±2.

TABLE 1

|  | tc_edge: 0 | tc_edge: 1 | tc_edge: 2 | tc_edge: 3 |
|---|---|---|---|---|
| tp_edge: 0 | $X_i$ [64:127]; 64 samples; 16 symbols; fractional value = 0 | $X_i$ [64:126]; 63 samples; 16 symbols; fractional value = −1 | $X_i$ [64:125]; 62 samples; if accumulated fractional value >= 0 then 16 symbols and fractional value = −2; if accumulated fractional value < 0 then 15 symbols and fractional value = 2 | $X_i$ [64:124]; 61 samples; 15 symbols; fractional value = 1 |
| tp_edge: 1 | $X_i$ [63:127]; 65 samples; 16 symbols; fractional value = 1 | $X_i$ [63:126]; 64 samples; 16 symbols; fractional value = 0 | $X_i$ [63:125]; 63 samples; 16 symbols; fractional value = −1 | $X_i$ [63:124]; 62 samples; if accumulated fractional value >= 0 then 16 symbols and fractional value = −2; if accumulated |

TABLE 1-continued

| | tc_edge: 0 | tc_edge: 1 | tc_edge: 2 | tc_edge: 3 |
|---|---|---|---|---|
| | | | | fractional value < 0 then 15 symbols and fractional value = 2 |
| tp_edge: 2 | $X_i$ [62:127]; 66 samples; if accumulated fractional value >= 0 then 17 symbols and fractional value = −2; if accumulated fractional value < 0 then 16 symbols and fractional value = 2 | $X_i$ [62:126]; 65 samples; 16 symbols; fractional value = 1 | $X_i$ [62:125]; 64 samples; 16 symbols; fractional value = 0 | $X_i$ [62:124]; 63 samples; 16 symbols; fractional value = −1 |
| tp_edge: 3 | $X_i$ [61:127]; 67 samples; 17 symbols; fractional value = −1 | $X_i$ [61:126]; 66 samples; if accumulated fractional value >= 0 then 17 symbols and fractional value = −2; if accumulated fractional value < 0 then 16 symbols and fractional value = 2 | $X_i$ [61:125]; 65 samples; 16 symbols; fractional value = 1 | $X_i$ [61:124]; 64 samples; 16 symbols; fractional value = 0 |

Referring back to FIG. 2, output 203 from block packing module 201 includes the block samples encompassed by the decision window, information on the sample size of the decision window, and the number of symbols of received data 112 captured by the decision window. A symbol packing module 205 receives output 203 and determines the groupings of samples of the decision window to be used for making bit decisions on symbols of received data 111. As seen from Table 1, the number of symbols captured by the decision window may be 15, 16, or 17. The number of samples within each symbol is nominally 4. However, depending on the hypothesized speed of receiver clock 115 relative to the symbol frequency of received data 111, the number of samples for a symbol may deviate from 4. For example, if receiver clock 115 is hypothesized to be faster than the symbol frequency of received data 111, then a symbol may contain up to 5 samples. Conversely, if receiver clock 115 is hypothesized to be slower than the symbol frequency of received data 111, then a symbol may contain only 3 samples. Table 2 below summarizes groupings of samples of the decision window for making bit decisions on symbols for an over-sampling ratio of 4 for one or more embodiments of symbol packing module 205. For ease of explanation, decision window samples encompassing $X_i$ [(64−tp_edge:127−tc_edge] have been re-indexed as DW [0:last_sample], where last_sample may be 60, 61, 62, 63, 64, 65, or 66. Table 2 also includes information on the hypothesized speed of receiver clock 115 relative to the symbol frequency of received data 111.

TABLE 2

| Sample size of decision window | Number of symbols in decision window | Groupings of DW[0: last_sample] for the symbols |
|---|---|---|
| 64 | 16 | DW[0:63] = {DW[0:3], DW[4:7], DW[8:11], ..., DW[56:59], DW[60:63]}; receiver clock frequency = symbol frequency |
| 61 | 15 | DW[0:60] = {DW[0:3], DW[4:7], DW[8:11], ..., DW[52:55], DW[56:60]}; receiver clock frequency > symbol frequency |
| 62 | 15 | DW[0:61] = {DW[0:3], DW[4:7], DW[8:11], ..., DW[24:27], DW[28:32], DW[33:36], ..., DW[53:56], DW[57:61]}; receiver clock frequency > symbol frequency |
| 62 | 16 | DW[0:61] = {DW[0:3], DW[4:7], DW[8:11], ..., DW[24:27], DW[28:30], DW[31:34], ..., DW[55:58], DW[59:61]}; receiver clock frequency < symbol frequency |
| 63 | 16 | DW[0:62] = {DW[0:3], DW[4:7], DW[8:11], ..., DW[56:59], DW[60:62]}; receiver clock frequency < symbol frequency |
| 65 | 16 | DW[0:64] = {DW[0:3], DW[4:7], DW[8:11], ..., DW[56:59], DW[60:64]}; receiver clock frequency > symbol frequency |
| 66 | 16 | DW[0:65] = {DW[0:3], DW[4:7], DW[8:11], ..., DW[24:27], DW[28:32], DW[33:36], ..., DW[53:56], DW[57:60], DW[61:65]}; receiver clock frequency > symbol frequency |
| 66 | 17 | DW[0:65] = {DW[0:3], DW[4:7], DW[8:11], ..., DW[24:27], DW[28:30], DW[31:34], ..., DW[55:58], DW[59:62], DW[63:65]}; receiver clock frequency < symbol frequency |
| 67 | 17 | DW[0:66] = {DW[0:3], DW[4:7], DW[8:11], ..., DW[56:59], DW[60:63], DW[64:66]}; receiver clock frequency < symbol frequency |

Output 207 from symbol packing module 205 includes groupings of samples of the decision window to be used for making bit decisions on the symbols, and information on the hypothesized speed of receiver clock 115 relative to the symbol frequency of received data 111. A data symbol decision module 209 receives output 207 and makes a bit decision for each symbol. As seen from Table 2, the number of samples for a grouping may be 3, 4, or 5. Data symbol decision module 209 outputs symbol bit decisions 211 to a rate compensation FIFO 213, which may perform rate compensation by deleting or inserting additional symbols to generate recovered data 123. Table 3 below summarizes symbol bit decisions for symbol groupings of various sample sizes for one or more embodiments of data symbol decision module 209. In general, a symbol bit decision is made based on the sample value near the center of the grouping. However, when there is an ambiguity in the sample value, information on the known speed of receiver clock 115 relative to the symbol frequency of received data 111 (e.g., an overboosting condition or an underboosting condition), or information on the hypothesized speed of receiver clock 115 may be used to resolve the ambiguity. For example, if the receiver clock frequency is hypothesized to be faster than the symbol frequency, then an ambiguity may be resolved by selecting a sample after the center of the grouping as the symbol bit decision.

TABLE 3

| Sample grouping for making symbol bit decision | | Symbol bit decision |
|---|---|---|
| Four bit group | 0000 | 0 |
| | 0001 | 0 |
| | 0010 and overboosting = 1 | 0 |
| | 0010 and underboosting = 1 | 1 |
| | 0011 and receiver clock frequency < symbol frequency | 0 |
| | 0011 and receiver clock frequency > symbol frequency | 1 |
| | 0100 and overboosting = 1 | 0 |
| | 0100 and underboosting = 1 | 1 |
| | 0101 and receiver clock frequency < symbol frequency | 0 |
| | 0101 and receiver clock frequency > symbol frequency | 1 |
| | 0110 | 1 |
| | 0111 | 1 |
| | 1000 | 0 |
| | 1001 | 0 |
| | 1010 and overboosting = 1 | 0 |
| | 1010 and underboosting = 1 | 1 |
| | 1011 and receiver clock frequency < symbol frequency | 0 |
| | 1011 and receiver clock frequency > symbol frequency | 1 |
| | 1100 and overboosting = 1 | 0 |
| | 1100 and underboosting = 1 | 1 |
| | 1101 and receiver clock frequency < symbol frequency | 0 |
| | 1101 and receiver clock frequency > symbol frequency | 1 |
| | 1110 | 1 |
| | 1111 | 1 |
| Three bit group | 000 | 0 |
| | 001 | 0 |
| | 010 and overboosting = 1 | 0 |
| | 010 and underboosting = 1 | 1 |
| | 011 | 1 |
| | 100 | 0 |
| | 101 | 0 |
| | 110 and overboosting = 1 | 0 |
| | 110 and underboosting = 1 | 1 |
| | 111 | 1 |
| Five bit group | Same as treating middle three bits as a three bit group | |

Figure 5:
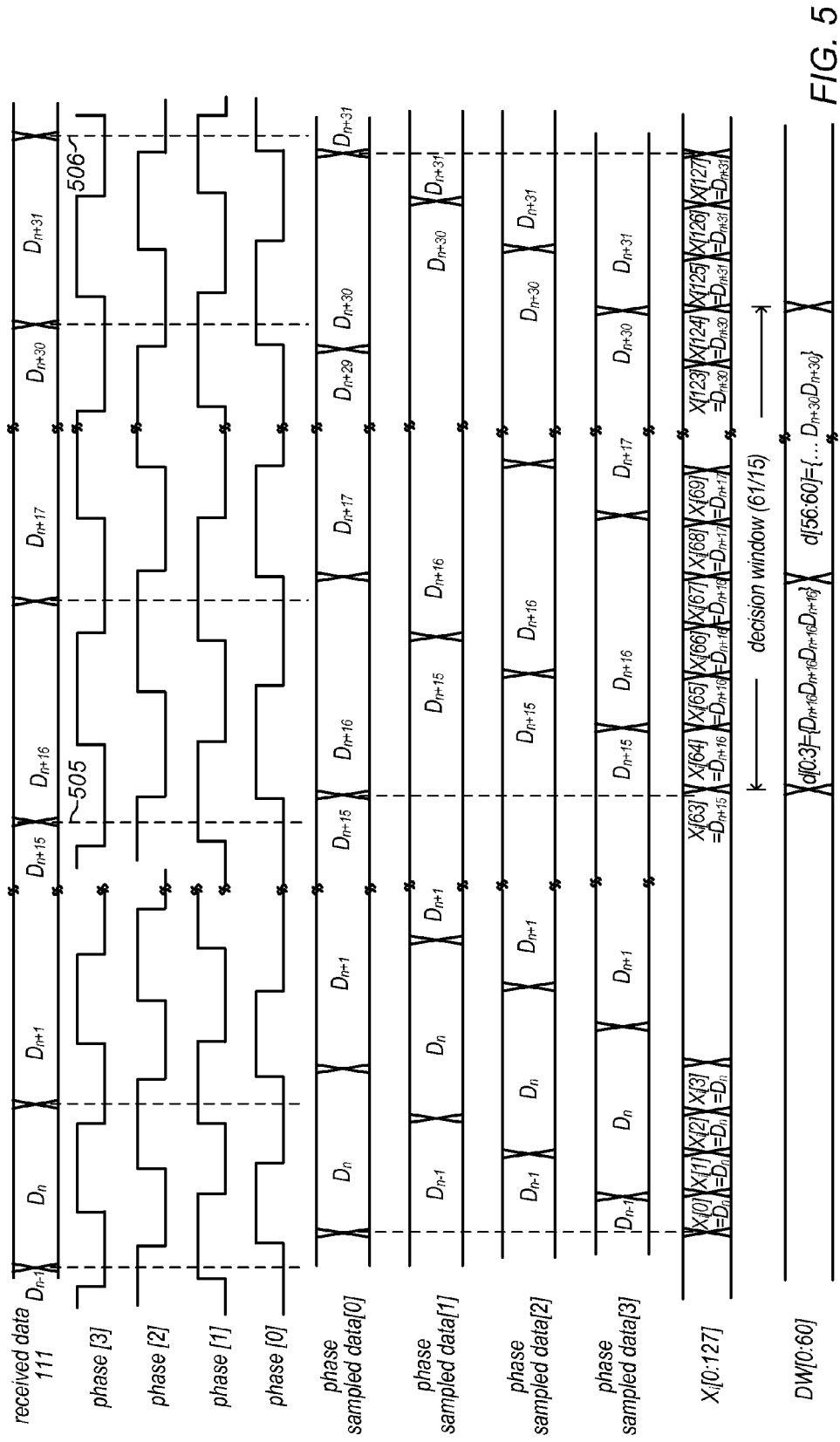
FIG. 5 illustrates packing of oversampled data into a 61-bit decision window used to recover 15 bits of received data when the receiver clock is faster than the transmitter clock according to one or more embodiments of the present disclosure.

FIG. 5 illustrates packing of oversampled data into a 61-bit decision window used to recover 15 bits of received data when the receiver clock is faster than the transmitter clock according to one or more embodiments of the present disclosure. As in FIG. 4, received data 111 are over sampled by clock phase [3:0] 303-300 to generate oversampled data [N−1:0] 112, which are represented by phase sampled data [3:0] 403-400. The last data transition edge within previous data packet $X_i$ [0:63] occurs at transition edge 505 between data $D_{n+15}/D_{n+16}$. As in FIG. 4, this data transition edge falls between rising edges of clock phase [1] 301 and clock phase [0] 300. Therefore, tp_edge[1:0] is 0. The last data transition edge within current data packet $X_i$ [64:127] occurs at transition edge 506 between data $D_{n+31}/D_{n+32}$. However, because the frequency of clock phase [3:0] 303-300 is faster than the symbol frequency of received data 111, this data transition edge 506 is now between rising edges of clock phase [0] 300 and clock phase [3] 303. Therefore, tc_edge[1:0] is 3. Using Table 1, block packing module 201 generates the decision window to be $X_i$ [64:124]. The sample size of the decision window is 61 samples. There are 15 symbols of received data 112 captured by the decision window and the fractional value is 1. Using Table 2, symbol packing module 205 determines the groupings of samples for symbol bit decisions as DW[0:60]={(DW[0:3], DW[4:7], DW[8:11], . . . , DW[52:55], DW[56:60]}={$X_i$ [64:67], $X_i$ [68:71], $X_i$ [72:75], . . . , $X_i$ [116:119], $X_i$ [120:124]}. Note that because receiver clock 115 is hypothesized to be faster than the symbol frequency of received data 111, the sample grouping for the last symbol has 5 samples.

Figure 6:
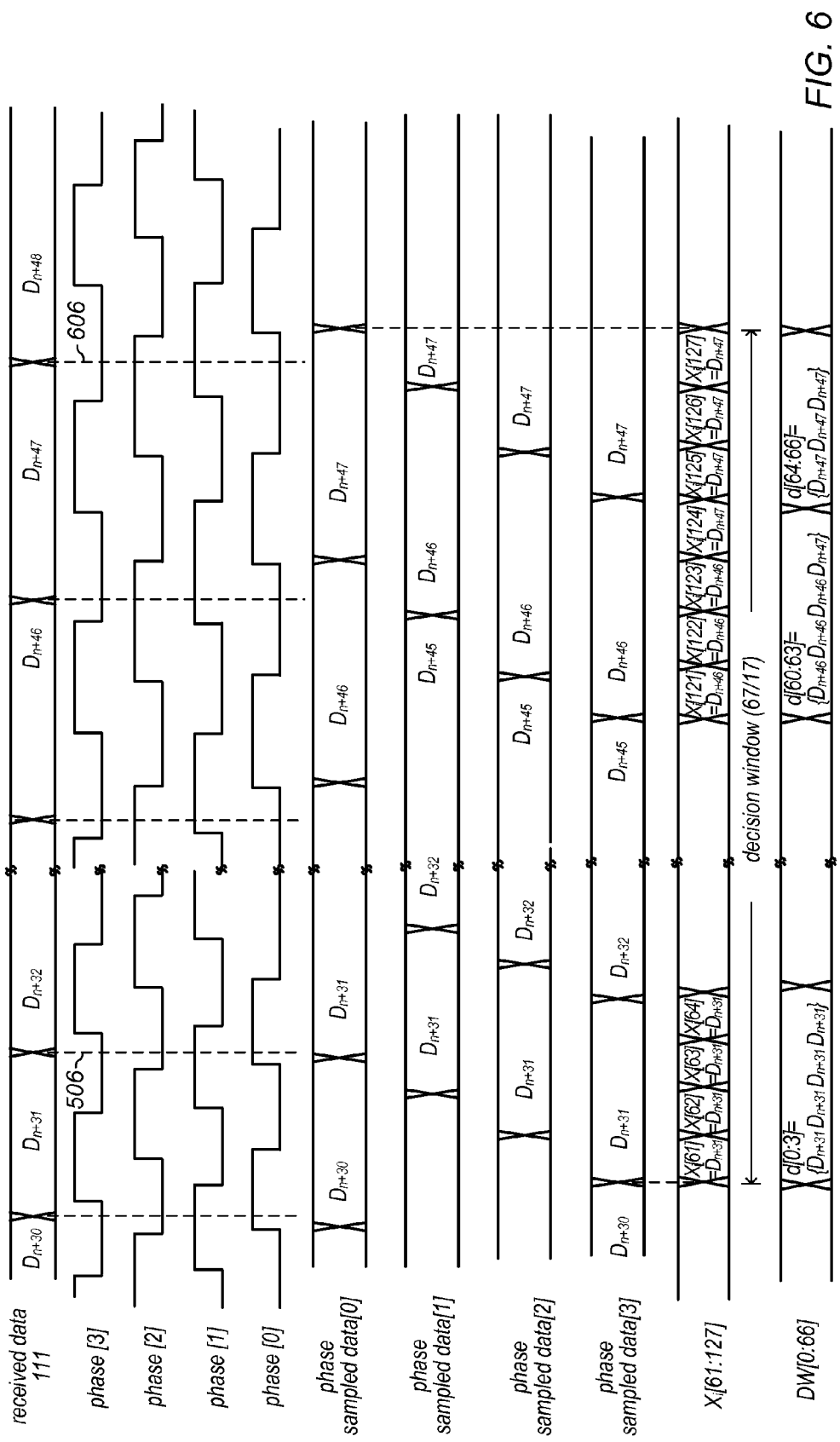
FIG. 6 illustrates packing of oversampled data into a 67-bit decision window used to recover 17 bits of received data when the receiver clock is slower than the transmitter clock according to one or more embodiments of the present disclosure.

FIG. 6 illustrates packing of oversampled data into a 67-bit decision window used to recover 17 bits of received data when the receiver clock is slower than the transmitter clock according to one or more embodiments of the present disclosure. FIG. 6 illustrates the generation of the decision window and the grouping of samples for symbol bit decisions following the decision window of FIG. 5. Because the current data packet $X_i$ of FIG. 5 is now the previous data packet of FIG. 6, the last data transition edge within previous data packet $X_i$ [0:63] occurs at transition edge 506 between data $D_{n+31}/D_{n+32}$. This data transition edge 506 is between rising edges of clock phase [0] 300 and clock phase [3] 303. Therefore, tp_edge[1:0] is 3. The last data transition edge within current data packet $X_i$ [64:127] occurs at transition edge 606 between data $D_{n+47}/D_{n+48}$. However, because frequency of clock phase [3:0] 303-300 is now slower than the symbol frequency of received data 111, this data transition edge 606 is now between rising edges of clock phase [1] 301 and clock phase [0] 300. Therefore, tc_edge[1:0] is 0. Using Table 1, block packing module 201 generates the decision window to be $X_i$ [61:127]. The sample size of the decision window is 67 samples. There are 17 symbols of received data 112 captured by the decision window and the fractional value is −1. Using Table 2, symbol packing module 205 determines the groupings of samples for symbol bit decisions as DW[0:66]{DW[0:3], DW[4:7], DW[8:11], . . . , DW[56:59], DW[60:63], DW[64:66]}=($X_i$ [61:64], $X_i$ [65:68], $X_i$ [69:72], . . . , $X_i$ [117:120], $X_i$ [121:124], $X_i$ [125:127]). Note that because receiver clock 115 is hypothesized to be slower than the symbol frequency of received data 111, the sample grouping for the last symbol has 3 samples.

Figure 7:
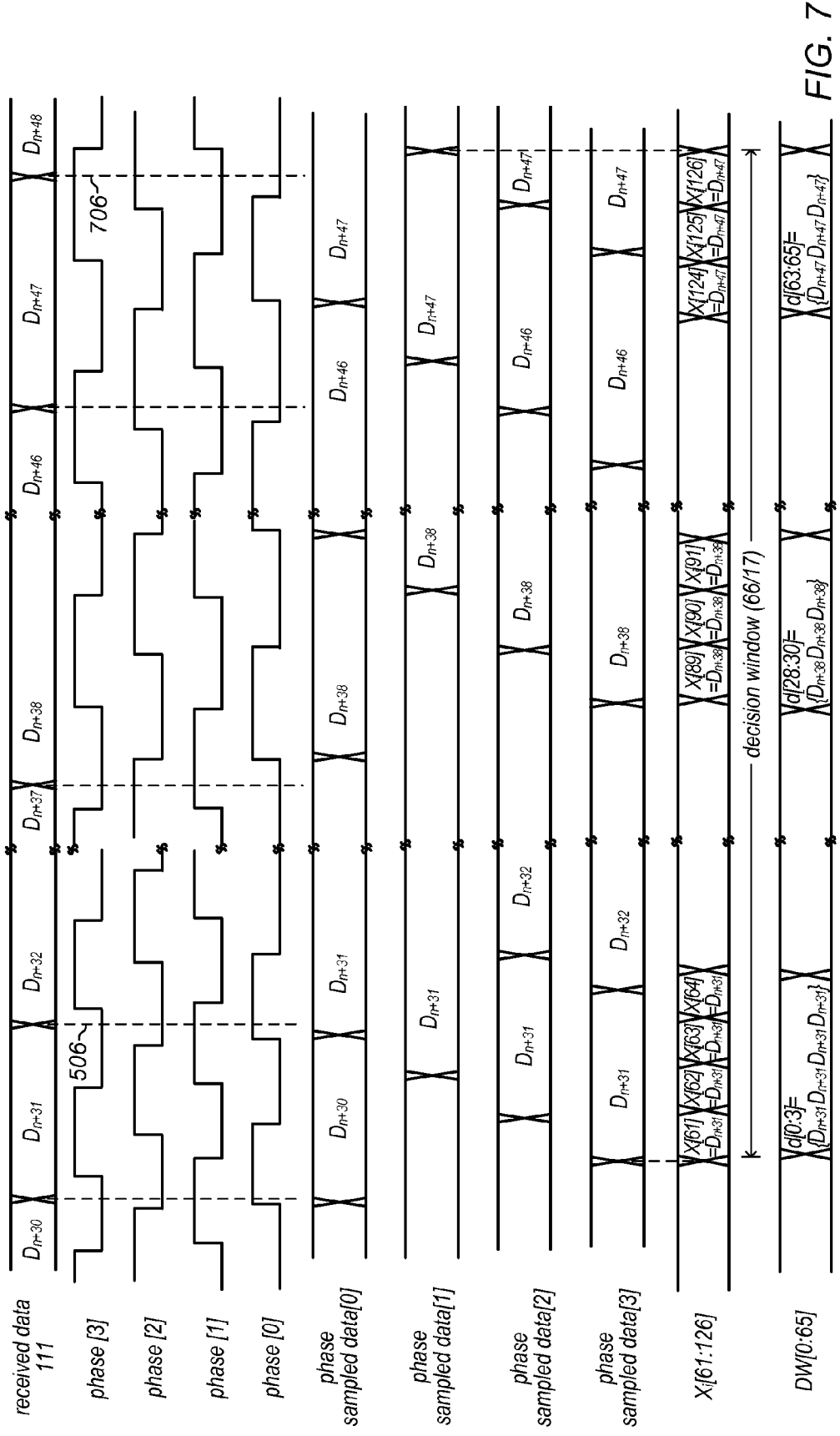
FIG. 7 illustrates packing of oversampled data into a 66-bit decision window used to recover 17 bits of received data when the receiver clock is slower than the transmitter clock according to one or more embodiments of the present disclosure.

FIG. 7 illustrates packing of oversampled data into a 66-bit decision window used to recover 17 bits of received data when the receiver clock is slower than the transmitter clock according to one or more embodiments of the present disclosure. FIG. 7 illustrates a second example of the generation of the decision window and the grouping of samples for symbol bit decisions following the decision window of FIG. 5. The last data transition edge within previous data packet $X_i$ [0:63] occurs at transition edge 506 between data $D_{n+31}/D_{n+32}$. As in FIG. 5, this data transition edge 506 is between rising edges of clock phase [0] 300 and clock phase [3] 303. Therefore, tp_edge[1:0] is 3. The last data transition edge within current data packet $X_i$ [64:127] occurs at transition edge 706 between data $D_{n+47}/D_{n+48}$. Because the frequency of clock phase [3:0] 303-300 is slower than the symbol frequency of received data 111, this data transition edge 706 is now between rising edges of clock phase [2] 302 and clock phase [1] 301. Therefore, tc_edge[1:0] is 1. Using Table 1, block packing module 201 generates the decision window to be $X_i$ [61:126]. The sample size of the decision window is 66 samples. Because the accumulated fractional value is 1 as accumulated from the fractional value of FIG. 5, there are 17 symbols of received data 112 captured by the decision window and the fractional value becomes −2. Using Table 2, symbol packing module 205 determines the groupings of samples for symbol bit decisions as DW[0:65]={DW[0:3], DW[4:7], DW[8:11], . . . , DW[24:27], DW[28:30], DW[31:34], . . . , DW[55:58], DW[59:62], DW[63:65]}={$X_i$ [61:64], $X_i$ [65:68], $X_i$ [69:72], . . . , $X_i$ [85:88], $X_i$ [89:91], $X_i$ [92:95], . . . , $X_i$ [116:119], $X_i$ [120:123], $X_i$ [124:126]}. Note that because receiver clock 115 is hypothesized to be slower than the symbol frequency of received data 111, the sample groupings for $X_i$ [89:91] and $X_i$ [124:126] have 3 samples.

The various components described herein may be implemented with appropriate hardware and/or software to perform the various operations described herein. For example, in various embodiments, such components may include one or more processors, logic, memory, machine readable instructions (e.g., software, firmware, or other instructions stored in a memory or a machine readable medium), and/or other components as may be desired in particular implementations.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method for data recovery comprising: receiving a stream of data symbols, wherein the data symbols change at a symbol frequency;
   oversampling the received data symbols with a plurality of substantially evenly-spaced multi-phase clocks of substantially identical frequency to generate a plurality of oversampled data, wherein the number of the multi-phase clocks is N and each of the data symbols is oversampled approximately N times;
   packing the oversampled data into a data block of M samples, wherein M is an integer multiple of N;
   tracking locations of data transitions of the samples within the data block;
   using the tracked locations to determine a decision window of the data block;
   grouping the samples residing in the decision window into a plurality of symbol groups; and making a symbol bit decision for each of the symbol groups;
   wherein the data block comprises a previous data packet of M/2 samples and a current data packet of M/2 samples; and
   wherein the tracking locations of data transitions of the samples comprises: locating a last data transition edge within the previous data packet: and locating a last data transition edge within the current data packet.

2. The method of claim 1, wherein the data transitions of the samples within the data block do not move by more than half of a period of one of the multi-phase clocks.

3. The method of claim 1, wherein the packing, tracking, using, grouping, and making are repeated for successive data blocks of oversampled data, wherein the current data packet of a current block becomes the previous data packet of a next block and the current data packet of the next block is filled with the next M/2 oversampled data.

4. The method of claim 1, wherein the decision window comprises:
   a full complement of the oversampled data of a data symbol that overlaps into the current data packet from the previous data packet; and
   a full complement of the oversampled data of all data symbols that are fully contained within the current data packet.

5. The method of claim 1, wherein the last data transition edge within the current data packet of a current block becomes the last data transition edge within the previous data packet of a next block, and wherein the current data packet of the current block becomes the previous data packet of the next block and the current data packet of the next block is filled with the next M/2 oversampled data.

6. The method of claim 1, wherein the decision window comprises a full complement of the oversampled data of the data symbols residing in the decision window and wherein the number of the samples residing in the decision window is equal to a length of the current data packet minus the location of the last data transition edge within the previous data packet plus the location of the last data transition edge within the current data packet.

7. The method of claim 6, wherein the using the tracked locations to determine a decision window further comprises determining a number of the data symbols residing in the decision window.

8. The method of claim 7, wherein the determining a number of the data symbols comprises estimating the frequency of the evenly-spaced multi-phase clock relative to the symbol frequency using the location of the last data transition edge within the previous data packet and the location of the last data transition edge within the current data packet.

9. The method of claim 8, wherein the estimating the frequency comprises tracking movement of the frequency of the evenly-spaced multi-phase clock relative to the symbol frequency across a plurality of decision windows.

10. The method of claim 9, wherein if there is an ambiguity in the frequency of the evenly-spaced multi-phase clock relative to the symbol frequency, the frequency of the evenly-spaced multi-phase clock is estimated to be slower than the symbol frequency if an estimate of a previous decision window indicates that the evenly-spaced multi-phase clock was faster than the symbol frequency.

11. The method of claim 9, wherein if there is an ambiguity in the frequency of the evenly-spaced multi-phase clock relative to the symbol frequency, the frequency of the evenly-spaced multi-phase clock is estimated to be faster than the symbol frequency if an estimate of a previous decision window indicates that the evenly-spaced multi-phase clock was slower than the symbol frequency.

12. The method of claim 7, wherein the grouping the samples residing in the decision window comprises:
estimating the frequency of the evenly-spaced multi-phase clock relative to the symbol frequency using the number of the samples and the number of the data symbols residing in the decision window; and
using the frequency estimate to group the samples such that the symbol group nominally contains N samples.

13. The method of claim 12, further comprising determining that at least one symbol group contains (N−1) samples if the frequency of the evenly-spaced multi-phase clock is estimated to be less than the symbol frequency.

14. The method of claim 12, further comprising determining that at least one symbol group contains (N+1) samples if the frequency of the evenly-spaced multi-phase clock is estimated to be more than the symbol frequency.

15. The method of claim 1, wherein the making a symbol bit decision comprises selecting a sample near the center of the symbol group to be the symbol bit decision.

16. The method of claim 1, wherein the tracking locations of data transitions of the samples comprises locating edges of the data transitions within one of N possible intervals between sampling edges of the N evenly-spaced multi-phase clocks.

17. An apparatus for data recovery comprising:
a sampler adapted to oversample a received stream of data symbols with a plurality of substantially evenly-spaced multi-phase clocks of substantially identical frequency to generate a plurality of oversample data, wherein the data symbols change at a symbol frequency, the number of the multi-phase clocks is N, and each of the data symbols is oversampled approximately N times;
a block packing module adapted to pack the oversampled data into a data block of M samples, wherein M is an integer multiple of N, to track locations of data transitions of the samples within the data block, and to use the tracked locations to determine a decision window of the data block;
a symbol packing module adapted to group the samples residing in the decision window into a plurality of symbol groups; and a data symbol decision module adapted to make a symbol bit decision for each of the symbol groups;
wherein the data block comprises a previous data packet of M/2 samples and a current data packet of M/2 samples; and
wherein the block packing module is further adapted to locate a last data transition edge within the previous data packet and to locate a last data transition edge within the current data packet.

18. The apparatus of claim 17, wherein the decision window comprises: a full complement of the oversampled data of a data symbol that overlaps into the current data packet from the previous data packet; and
a full complement of the oversampled data of all data symbols that are fully contained within the current data packet.

19. A machine readable medium comprising non-transitory instructions which when executed by one or more processors of a device cause the device to: receive a stream of data symbols, wherein the data symbols change at a symbol frequency;
oversample the received data symbols with a plurality of substantially evenly-spaced multi-phase clocks of substantially identical frequency to generate a plurality of oversampled data, wherein the number of the multi-phase clocks is N and each of the data symbols is oversampled approximately N times;
pack the oversampled data into a data block of M samples, wherein M is an integer multiple of N;
track locations of data transitions of the samples within the data block;
use the tracked locations to determine a decision window of the data block;
group the samples residing in the decision window into a plurality of symbol groups;
and make a symbol bit decision for each of the symbol groups,
wherein the data block comprises a previous data packet of M/2 samples and a current data packet of M/2 samples; and
wherein the tracking locations of data transitions of the samples comprises: locating a last data transition edge within the previous data packet; and locating a last data transition edge within the current data packet.

\* \* \* \* \*